Figure 1:
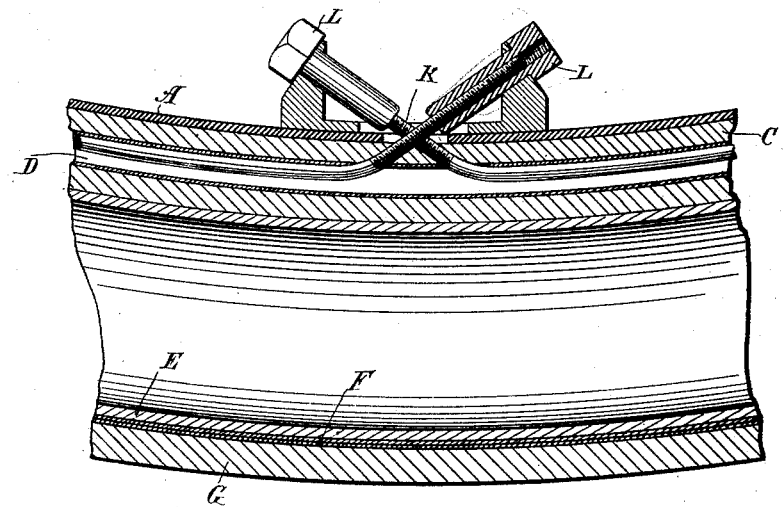

(No Model.)

T. W. ROBERTSON.
PNEUMATIC TIRE.

No. 483,583. Patented Oct. 4, 1892.

Witnesses:
Raphael Netter
Ernest Hopkinson

Inventor
Thomas W. Robertson
by
Duncan & Page
Attorneys

UNITED STATES PATENT OFFICE.

THOMAS WILSON ROBERTSON, OF DUBLIN, IRELAND.

PNEUMATIC TIRE.

SPECIFICATION forming part of Letters Patent No. 483,583, dated October 4, 1892.

Application filed September 17, 1891. Serial No. 405,968. (No model.) Patented in England November 29, 1890, No. 19,497.

*To all whom it may concern:*

Be it known that I, THOMAS WILSON ROBERTSON, a subject of the Queen of Great Britain, residing at Dublin, in the county of Dublin, Ireland, have invented certain new and useful Improvements in Pneumatic Tires, (for which I have obtained a patent in Great Britain, No. 19,497, dated November 29, 1890,) of which the following is a specification, reference being had to the drawings accompanying and forming a part of the same.

My invention is a new and improved means for securing an inflated or pneumatic tire to the felly or rim of a cycle-wheel.

In carrying out my invention I form in the rim or felly of a wheel two deep circumferential grooves, one near each edge thereof. I employ an inflatable rubber tube that surrounds the felly and a protective cover therefor, which has at each edge a tubular channel for the reception of a band, wire, or cord. This cover I place over the inner inflatable tube and force its channels or hollow edges into the aforesaid grooves and draw the wire or cord tightly through openings in the rim and secure it on the inside of the rim, whereby the tire is held firmly in position. This construction is illustrated in the drawings, in which—

Figure 2:
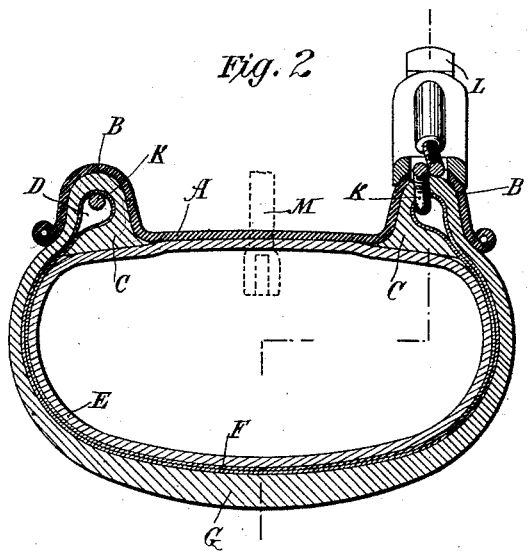

Figure 1 is a longitudinal section on line $x$ $x$ of Fig. 2, which latter is a cross-section of the improved tire attached to the felly of a wheel.

A is the rim of a cycle-wheel. Surrounding this wheel is an inflatable tube E, composed, preferably, of india-rubber. Over this is a covering which prevents the undue expansion of the tube E and serves to bind or hold it to the rim. The said cover is made of india-rubber, preferably thickened at the point which comes in contact with the ground in traveling, and is united with a woven fabric, such as a canvas strip or layer F. The fabric F and rubber G are firmly united by vulcanization or cement, and the former is preferably woven or cut in such manner as not to yield or stretch laterally to an appreciable degree. Two tubular channels or passages D are formed in the cover, one at each side or edge thereof. Through these passages are passed wires K for securing the cover to the rim. The ends of the wires K emerge from the tubular channels D through holes in the walls thereof and pass through holes provided in the rim A and are secured to the rim in any convenient manner which permits of suitable tension being set up in them. One method is to screw-thread the ends of the wires after passing them through the said holes in the rim and tighten them by nuts L L, screwed on against the inner surfaces of the rim.

I provide at each side of the rim of the wheel a deep channel or groove B, shaped to receive and support the tubular portions of the cover G when the latter is placed in position on the wheel. The said grooves are made sufficiently deep to prevent lateral displacement of the cover when the tire is in use—that is to say, the grooves must be constructed so that not only are the tubular portions of the cover prevented from being forced outward over the edge of the rim, but they are also prevented from being forced inward by the pressure to which such tires are subjected when running. This is a very important feature of the invention and is essential to the successful working of the same.

I do not claim, broadly, the plan of securing an elastic or flexible tire upon the rim of a wheel by means of wires, nor do I claim securing such tires by wires placed one on each side of the rim, irrespective of the particular features herein set forth; but

What I claim is—

The combination, with the felly A, having the side grooves or recesses B, of an inclosing or protective cover for a tire, composed of a woven strip F with longitudinal pockets D along its edges and a rubber sheet or band united to the said strip and having enlargements along its edges in which the said pockets are embedded, and wires contained in the pockets and passing through the felly and tightened so as to hold the edges of the said cover in the grooves or recesses in the felly, the said grooves being sufficiently deep to receive the enlarged edges of the cover and prevent lateral displacement of the same, as set forth.

THOMAS WILSON ROBERTSON.

Witnesses:
J. D. HADDOCK,
ALEX. J. REID.